United States Patent
Petermann et al.

(10) Patent No.: US 10,730,957 B2
(45) Date of Patent: Aug. 4, 2020

(54) PROCESS OF PREPARING AN ESTERIFIED CELLULOSE ETHER IN THE PRESENCE OF AN ALKALI METAL CARBOXYLATE AND AN ALIPHATIC CARBOXYLIC ACID

(71) Applicant: Dow Global Technologies LLC, Midland, MI (US)

(72) Inventors: Oliver Petermann, Hamburg (DE); Matthias Sprehe, Walsrode (DE); Warren K. Miller, Bend, OR (US)

(73) Assignee: Dow Global Technologies LLC, Midland, MI (US)

( * ) Notice: Subject to any disclaimer, the term of this patent is extended or adjusted under 35 U.S.C. 154(b) by 474 days.

(21) Appl. No.: 14/420,911

(22) PCT Filed: Aug. 15, 2013

(86) PCT No.: PCT/US2013/055183
§ 371 (c)(1),
(2) Date: Feb. 11, 2015

(87) PCT Pub. No.: WO2014/031446
PCT Pub. Date: Feb. 27, 2014

(65) Prior Publication Data
US 2015/0218291 A1  Aug. 6, 2015

Related U.S. Application Data

(60) Provisional application No. 61/692,932, filed on Aug. 24, 2012.

(51) Int. Cl.
C08B 13/00 (2006.01)
C08B 11/20 (2006.01)

(52) U.S. Cl.
CPC .............. *C08B 13/00* (2013.01); *C08B 11/20* (2013.01)

(58) Field of Classification Search
CPC ........... A61K 9/28; C08B 13/00; C08B 11/00; C08B 3/12
USPC ....................... 514/54; 536/66, 64
See application file for complete search history.

(56) References Cited

U.S. PATENT DOCUMENTS

| | | |
|---|---|---|
| 2,852,508 A | 9/1958 | Hiatt et al. |
| 3,435,027 A | 3/1969 | Desmarais et al. |
| 3,489,743 A | 1/1970 | Crane |
| 3,629,237 A | 12/1971 | Koyanagi et al. |
| 4,226,981 A | 10/1980 | Onda et al. |
| 4,316,982 A | 2/1982 | Holst et al. |
| 4,365,060 A | 12/1982 | Onda et al. |
| 5,776,501 A | 7/1998 | Kokubo et al. |
| 6,296,876 B1* | 10/2001 | Odidi ................... A61K 9/2886 424/480 |
| 2012/0264833 A1* | 10/2012 | Babcock ................ A61P 43/00 514/781 |
| 2014/0171441 A1* | 6/2014 | Babcock .............. A61K 9/1652 514/254.04 |

FOREIGN PATENT DOCUMENTS

| | | | | |
|---|---|---|---|---|
| EP | 0219426 | * | 6/1986 | ............. C08B 13/00 |
| EP | 0210917 | | 2/1987 | |
| EP | 0219426 A2 | | 4/1987 | |
| EP | 1141029 | | 10/2001 | |
| EP | 1423433 B1 | | 6/2004 | |
| GB | 722594 | | 1/1955 | |
| JP | 5339301 | | 12/1993 | |
| WO | 2005115330 A2 | | 12/2005 | |
| WO | WO 2008050209 A1 | * | 5/2008 | ........... A61K 9/4816 |
| WO | 2011159626 A1 | | 12/2011 | |
| WO | WO2014/031422 | * | 2/2014 | ............. C08B 11/20 |

OTHER PUBLICATIONS

Curatolo et al ("Utility of Hydroxypropylmethylcellulose Acetate Succinate (HPMCAS) for Initiation and Maintenance of Drug Supersaturation in the GI Milieu", Pharmaceutical Research, vol. 26, Issue 6, pp. 1419-1431, Jun. 2009.).*
Abstract of Zhang et al., "Synthesis of Excipient HPMCP" Zhongguo Yiyao Gongye Zazhi vol. 24 No. 3, pp. 104-107 (Year: 1993).*
Journal of Pharm. and Biomed. Anal., 56, 2011, pp. 743-748, Absolute molecular weight determination of hypromellose acetate succinate, R. Chen et al.
Cellulose, 2007, pp. 49-64, Cellulose esters in drug delivery, Edgar.
Int. Journal of Polymer Anal.Charact., 14, 2009, pp. 617-630, Characerization of Hypromellose Acetate Succinate, Chen.
Z.Anal. Chem., 286, 1977, pp. 161-190, Die Analytik von Celluloseäthergruppen, Bartelmus and Ketterer.

* cited by examiner

*Primary Examiner* — Eric Olson

(57) ABSTRACT

In a process for preparing an esterified cellulose ether a cellulose ether is esterified with (i) an aliphatic monocarboxylic acid anhydride or (ii) a dicarboxylic acid anhydride or (iii) a combination of an aliphatic monocarboxylic acid anhydride and a dicarboxylic acid anhydride in the presence of an alkali metal carboxylate and an aliphatic carboxylic acid, wherein the molar ratio [alkali metal carboxylate/anhydroglucose units of cellulose ether] is not more than [1.20/1] and the molar ratio [aliphatic carboxylic acid/anhydroglucose units of cellulose ether] is from [3.55/1] to [9.0/1].

14 Claims, No Drawings

PROCESS OF PREPARING AN ESTERIFIED CELLULOSE ETHER IN THE PRESENCE OF AN ALKALI METAL CARBOXYLATE AND AN ALIPHATIC CARBOXYLIC ACID

FIELD

The present invention relates to an improved process for preparing an esterified cellulose ether in the presence of an alkali metal carboxylate and an aliphatic carboxylic acid.

INTRODUCTION

Esters of cellulose ethers, their uses and processes for preparing them are generally known in the art. One method of producing cellulose ether-esters is described in U.S. Pat. No. 2,852,508, which discloses the reaction of a cellulose material selected from cellulose ethers and lower fatty acid esters of cellulose containing free and esterifiable hydroxyl groups with a bath consisting of not more than 3 parts of dicarboxylic acid anhydride as the esterifying agent, not more than three parts of a lower fatty acid as the solvent and a basic catalyst per part of cellulose material. Another method of producing cellulose ether-esters is described in U.S. Pat. No. 3,435,027.

Various known esters of cellulose ethers are useful as enteric polymers for pharmaceutical dosage forms, such as methylcellulose phthalate, hydroxypropyl methylcellulose phthalate, methylcellulose succinate, or hydroxypropyl methylcellulose succinate. Enteric polymers are those that are resistant to dissolution in the acidic environment of the stomach. Dosage forms coated with such polymers protect the drug from inactivation or degradation in the acidic environment or prevent irritation of the stomach by the drug. U.S. Pat. No. 4,365,060 discloses enterosoluble capsules which are said to have excellent enterosolubility behavior.

U.S. Pat. No. 4,226,981 discloses a process for preparing mixed esters of cellulose ethers, such as hydroxypropyl methyl cellulose acetate succinate (HPMCAS), by esterifying hydroxypropyl methylcellulose with succinic anhydride and acetic anhydride in the presence of an alkali carboxylate as the esterification catalyst and acetic acid as the reaction medium. The cellulose ether as the base material is introduced into the reaction vessel together with about 100 to 2,000 parts by weight of the carboxylic acid as the reaction medium and about 20 to 200 parts by weight of the alkali carboxylate as the catalyst, all being expressed per 100 parts by weight of the cellulose ether, followed by further introduction of predetermined amounts of succinic anhydride and an anhydride of an aliphatic monocarboxylic acid, the resulting mixture being heated at 60 to 110° C. for a period of 2-25 hours. In the working examples 250 g of acetic acid and 50 g of sodium acetate are utilized per 50 g of hydroxypropyl methyl cellulose. 15-60 g of succinic anhydride and 25-80 g of acetic anhydride are added and the reaction mixture is heated at 85° C. with agitation for 3 hours.

European Patent Application EP 0 219 426 discloses a process for producing an enteric-soluble acidic dicarboxylic acid ester of a cellulose ether wherein (a) a cellulose ether having hydroxypropoxyl groups as the ether-forming groups, of which a 2% by weight aqueous solution has a viscosity of at least 5 centipoise at 20° C., is reacted with (b) a dicarboxylic acid anhydride or a mixture thereof with an anhydride of an aliphatic monocarboxylic acid in the presence of (c) a combination of an alkali metal acetate and acetic acid. EP 0 219 426 shows that the acidic dicarboxylic acid esters produced from cellulose ethers which have a viscosity of at least 6 centipoise provided an enterosoluble film-coating material on tablets which had resistance against a simulated gastric juice. When comparative acidic dicarboxylic acid esters were produced from cellulose ethers having a viscosity of only 3 centipoise, a substantial number of tablets disintegrated in the simulated gastric juice. Acidic dicarboxylic acid esters produced from cellulose ethers of higher viscosity have a higher molecular weight than those produced from cellulose ethers of lower viscosity when comparable process and recipe parameters for producing the acidic dicarboxylic acid esters are applied. The process of EP 0 219 426 utilizes 50 to 150 parts by weight of an alkali metal acetate per 100 parts by weight of the cellulose ether and 200 to 700 parts by weight of acetic acid per 100 parts by weight of the cellulose ether. In the working examples hydroxypropyl methyl cellulose phthalate (HPMCP) or hydroxypropyl methyl cellulose acetate succinate (HPMCAS) are produced by reacting 100 parts by weight of hydroxypropyl methyl cellulose (HPMC), 80 parts by weight of sodium acetate and 300 parts by weight of acetic acid with either 120 parts by weight of phthalic anhydride or a combination of 25 parts by weight of succinic anhydride and 38 parts by weight of acetic anhydride.

A large number of presently known drugs have a low solubility in water, so that complex techniques are required to prepare a dosage form. One known method includes dissolving such drug together with a pharmaceutically acceptable water-soluble polymer in an organic solvent that is optionally blended with water, and to spray-dry the solution. The pharmaceutically acceptable water-soluble polymer is aimed at reducing the crystallinity of the drug, thereby minimizing the activation energy necessary for the dissolution of the drug, as well as establishing hydrophilic conditions around the drug molecules, thereby improving the solubility of the drug itself to increase its bioavailability, i.e., its in vivo absorption by an individual upon ingestion.

International Patent Application WO 2005/115330 discloses hydroxypropyl methyl cellulose acetate (HPMCA) polymers and hydroxypropyl methyl cellulose acetate succinate (HPMCAS) polymers with a specific combination of substitution levels. The HPMCA polymer has a degree of substitution of acetyl groups ($DOS_{Ac}$) of at least 0.15. The HPMCAS polymer has a degree of substitution of succinoyl groups ($DOS_S$) of at least 0.02, a $DOS_{Ac}$ of at least 0.65 and a sum of $DOS_{Ac}$ and $DOS_S$ of at least 0.85. WO 2005/115330 discloses that these HPMCAS and HPMCA polymers are useful for forming solid amorphous dispersions of hydrophobic drugs and suggests that when these HPMCAS and HPMCA polymers are used in combination with drugs that are prone to rapid crystallization from supersaturated aqueous solutions, the HPMCAS and HPMCA polymers are particularly effective at sustaining high drug concentrations and thereby enhancing absorption of drug in vivo. WO 2005/115330 discloses that the increased acetate substitution allows increased solubility of active agents in spray-dried solutions, while the increased succinate substitution increases the solubility of the polymer in aqueous solution.

International Patent Application WO 2011/159626 discloses an active ingredient and HPMC-AS having a degree of substitution of methoxy groups ($DS_M$) of ≤1.45, and a combined degree of substitution of acetyl groups ($DS_{Ac}$) and succinoyl groups ($DS_s$) of ($DS_{Ac}$+$DS_s$)≥1.25. Polymers HPMCAS-K(1), HPMCAS-K(2) and HPMCAS-K(3) were synthesized using Methocel® K3 Premium LV (Dow Chemical) as starting material. HPMCAS-K(1) was produced from 122 g HPMC, 97.9 g of acetic anhydride and totally 41.1 g of succinic anhydride in the presence of 198.8 g of glacial acetic acid, 79.3 g of sodium acetate and 1.9 g of sodium chlorate. HPMCAS-K(2) was produced from 122 g HPMC, 109.5 g of acetic anhydride and totally 30 g of succinic anhydride in the presence of 165 g of glacial acetic acid, 72.4 g of sodium acetate and 1.8 g of sodium chlorate. HPMCAS-K(3) was produced from 122.2 g HPMC, 142 g of acetic anhydride and totally 16 g of succinic anhydride in the presence of about 183 g of glacial acetic acid, 77 g of sodium acetate and 1.9 g of sodium chlorate. In each reaction the succinic anhydride and sodium acetate were added in two portions. Higher $DS_{acetate}$, higher $DS_{succinate}$ and apparent molecular weights were achieved by this process than in the prior art discussed in WO 2011/159626.

However, in view of the large diversity of drugs, it is self-evident that a limited variety of esterified cellulose ethers having a high degree of substitution of acetyl groups and succinoyl groups cannot fulfill all needs. Edgar et al., Cellulose (2007), 14:49-64 "Cellulose esters in drug delivery" state in the conclusion of their survey article: "The fundamental properties of cellulose esters are well-suited to improving drug delivery . . . . Much progress has been made in recent years in the application of well-studied cellulose esters to improve drug delivery systems. There is room for much more advancement, particularly by the in-depth study of structure property relationships as they pertain to pharmaceutical applications. Full success in this endeavor will require considerable vision, since the current path to market for novel pharmaceutical excipients is difficult, long, fraught with uncertainty, and expensive."

Accordingly, it is one object of the present invention to find other ways of producing modified esterified cellulose ethers than by increasing their degree of substitution of ester groups. In view of the advantages of the acidic dicarboxylic acid esters of increased molecular weight produced from higher viscosity cellulose ethers as discussed in EP 0 219 426, it is a preferred object of the present invention to find other ways of producing modified esterified cellulose ethers such that the esterified cellulose ethers have a molecular weight which is substantially the same or even higher than esterified cellulose ethers produced according to known processes.

Moreover, the above-described processes for producing esterified cellulose ethers are expensive in terms of raw materials and purification procedures. Accordingly, it is another object of the present invention to find a less expensive way of producing esterified cellulose ethers.

SUMMARY

Surprisingly, it has been found that the weight average molecular weight of an ester of a cellulose ether can be varied by varying certain process parameters in the process for esterifying a cellulose ether, even when the cellulose ether used as a starting material and the amount of esterifying agent are kept the same.

The applicants of the present patent application believe that controlling the weight average molecular weight of an esterified cellulose ether is an important factor for influencing drug release rate from solid dispersions of a drug in an esterified cellulose ether. Edgar et al., Cellulose (2007), 14:49-64 mention a study on microparticle formation of theophylline with two CABs (cellulose acetate butyrates) of similar composition, differing substantially only in molecular weight. The release of theophylline was slowed dramatically by higher polymer molecular weight, speeded dramatically by lower particle size, and reduced substantially by particle formation from a higher viscosity solution.

Surprisingly, it has been found that the weight average molecular weight of an esterified cellulose ether can be varied by varying the molar ratio [aliphatic carboxylic acid/anhydroglucose units of cellulose ether] and/or by varying the molar ratio [alkali metal carboxylate/anhydroglucose units of cellulose ether] in the process for producing the esterified cellulose ether. Even more surprisingly, it has been found that esterified cellulose ethers having substantially the same or even a higher weight average molecular weight as in prior art processes can be produced even if the molar ratio [alkali metal carboxylate/anhydroglucose units of cellulose ether] and the molar ratio [aliphatic carboxylic acid/anhydroglucose units of cellulose ether] are both reduced in the process for producing the esterified cellulose ether, as compared to the specific processes taught in the prior art.

Accordingly, the present invention relates to a process for preparing an esterified cellulose ether wherein a cellulose ether is esterified with (i) an aliphatic monocarboxylic acid anhydride or (ii) a dicarboxylic acid anhydride or (iii) a combination of an aliphatic monocarboxylic acid anhydride and a dicarboxylic acid anhydride in the presence of an alkali metal carboxylate and an aliphatic carboxylic acid, wherein the molar ratio [alkali metal carboxylate/anhydroglucose units of cellulose ether] is not more than [1.20/1] and the molar ratio [aliphatic carboxylic acid/anhydroglucose units of cellulose ether] is from [3.55/1] to [9.0/1].

DESCRIPTION OF EMBODIMENTS

The cellulose ether used as a starting material in the process of the present invention has a cellulose backbone having β-1,4 glycosidically bound D-glucopyranose repeating units, designated as anhydroglucose units in the context of this invention, which are represented for unsubstituted cellulose by the formula

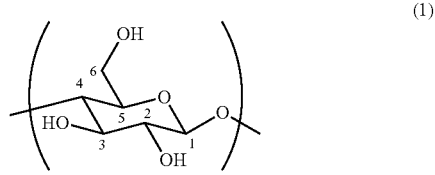

illustrating the numbering of the carbon atoms in the anhydroglucose units. The numbering of the carbon atoms in the anhydroglucose units is referred to in order to designate the position of substituents covalently bound to the respective carbon atom. The cellulose ether used as a starting material in the process of the present invention preferably is an alkyl cellulose, hydroxyalkyl cellulose or hydroxyalkyl alkylcellulose. This means that in the cellulose ether utilized in the process of the present invention, at least a part of the hydroxyl groups of the cellulose backbone at the 2-, 3- and 6-positions of the anhydroglucose units are substituted by alkoxyl groups or hydroxyalkoxyl groups or a combination of alkoxyl and hydroxyalkoxyl groups. The hydroxyalkoxyl groups are typically hydroxymethoxyl, hydroxyethoxyl and/or hydroxypropoxyl groups. Hydroxyethoxyl and/or hydroxypropoxyl groups are preferred. Typically one or two kinds of hydroxyalkoxyl groups are present in the cellulose ether. Preferably a single kind of hydroxyalkoxyl group, more preferably hydroxypropoxyl, is present. The alkoxyl groups are typically methoxyl, ethoxyl and/or propoxyl groups. Methoxyl groups are preferred.

Illustrative of the above-defined cellulose ethers are alkylcelluloses, such as methylcellulose, ethylcellulose, and propylcellulose; hydroxyalkylcelluloses, such as hydroxyethylcellulose, hydroxypropylcellulose, and hydroxybutylcellulose; and hydroxyalkyl alkylcelluloses, such as hydroxyethyl methylcellulose, hydroxymethyl ethylcellulose, ethyl hydroxyethylcellulose, hydroxypropyl methylcellulose, hydroxypropyl ethylcellulose, hydroxybutyl methylcellulose, and hydroxybutyl ethylcellulose; and those having two or more hydroxyalkyl groups, such as hydroxyethylhydroxypropyl methylcellulose. Most preferably, the cellulose ether is a hydroxypropyl methylcellulose.

The degree of the substitution of hydroxyl groups at the 2-, 3- and 6-positions of the anhydroglucose units by hydroxyalkoxyl groups is expressed by the molar substitution of hydroxyalkoxyl groups, the MS(hydroxyalkoxyl). The MS(hydroxyalkoxyl) is the average number of moles of hydroxyalkoxyl groups per anhydroglucose unit in the cellulose ether. It is to be understood that during the hydroxyalkylation reaction the hydroxyl group of a hydroxyalkoxyl group bound to the cellulose backbone can be further etherified by an alkylation agent, e.g. a methylation agent, and/or a hydroxyalkylation agent. Multiple subsequent hydroxyalkylation etherification reactions with respect to the same carbon atom position of an anhydroglucose unit yields a side chain, wherein multiple hydroxyalkoxyl groups are covalently bound to each other by ether bonds, each side chain as a whole forming a hydroxyalkoxyl substituent to the cellulose backbone.

The term "hydroxyalkoxyl groups" thus has to be interpreted in the context of the MS(hydroxyalkoxyl) as referring to the hydroxyalkoxyl groups as the constituting units of hydroxyalkoxyl substituents, which either comprise a single hydroxyalkoxyl group or a side chain as outlined above, wherein two or more hydroxyalkoxy units are covalently bound to each other by ether bonding. Within this definition it is not important whether the terminal hydroxyl group of a hydroxyalkoxyl substituent is further alkylated, e.g. methylated, or not; both alkylated and non-alkylated hydroxyalkoxyl substituents are included for the determination of MS(hydroxyalkoxyl). The cellulose ether utilized in the process of the invention generally has a molar substitution of hydroxyalkoxyl groups in the range 0.05 to 1.00, preferably 0.08 to 0.90, more preferably 0.12 to 0.70, most preferably 0.15 to 0.60, and particularly 0.20 to 0.50.

The average number of hydroxyl groups substituted by alkoxyl groups, such as methoxyl groups, per anhydroglucose unit, is designated as the degree of substitution of alkoxyl groups, DS(alkoxyl). In the above-given definition of D S, the term "hydroxyl groups substituted by alkoxyl groups" is to be construed within the present invention to include not only alkylated hydroxyl groups directly bound to the carbon atoms of the cellulose backbone, but also alkylated hydroxyl groups of hydroxyalkoxyl substituents bound to the cellulose backbone. The cellulose ethers according to this invention preferably have a DS(alkoxyl) in the range of 1.0 to 2.5, more preferably from 1.1 to 2.4, most preferably from 1.2 to 2.2 and particularly from 1.6 to 2.05.

The degree of substitution of alkoxyl groups and the molar substitution of hydroxyalkoxyl groups can be determined by Zeisel cleavage of the cellulose ether with hydrogen iodide and subsequent quantitative gas chromatographic analysis (G. Bartelmus and R. Ketterer, Z. Anal. Chem., 286 (1977) 161-190). Most preferably the cellulose ether utilized in the process of the invention is hydroxypropyl methylcellulose having a DS(methoxyl) within the ranges indicated above for DS(alkoxyl) and an MS(hydroxypropoxyl) within the ranges indicated above for MS(hydroxyalkoxyl).

The cellulose ether used as a starting material in the process of the present invention preferably has a viscosity of from 2.4 to 200 mPa·s, preferably from 2.4 to 100 mPa·s, more preferably from 2.5 to 50 mPa·s, in particular from 3 to 30 mPa·s, measured as a 2 weight-% aqueous solution at 20° C. according to ASTM D2363-79 (Reapproved 2006). Cellulose ethers of such viscosity can be obtained by subjecting a cellulose ether of higher viscosity to a partial depolymerization process. Partial depolymerization processes are well known in the art and described, for example, in European Patent Applications EP 1,141,029; EP 210,917; EP 1,423,433; and U.S. Pat. No. 4,316,982. Alternatively, partial depolymerization can be achieved during the production of the cellulose ethers, for example by the presence of oxygen or an oxidizing agent.

The cellulose ether is reacted with (i) an aliphatic monocarboxylic acid anhydride or (ii) a dicarboxylic acid anhydride or (iii) a combination of an aliphatic monocarboxylic acid anhydride and a dicarboxylic acid anhydride. Preferred aliphatic monocarboxylic acid anhydrides are selected from the group consisting of acetic anhydride, butyric anhydride and propionic anhydride. Preferred dicarboxylic acid anhydrides are selected from the group consisting of succinic anhydride, maleic anhydride and phthalic anhydride. A preferred aliphatic monocarboxylic acid anhydride can be used alone; or a preferred dicarboxylic acid anhydride can be used alone; or a preferred aliphatic monocarboxylic acid anhydride can be used in combination with a preferred dicarboxylic acid anhydride. More preferably the cellulose ether is esterified with (ii) succinic anhydride or phthalic anhydride or with (iii) succinic anhydride or phthalic anhydride in combination with an aliphatic monocarboxylic acid anhydride selected from the group consisting of acetic anhydride, butyric anhydride and propionic anhydride.

If an aliphatic monocarboxylic acid anhydride and a dicarboxylic acid anhydride are used for esterifying the cellulose ether, the two anhydrides may be introduced into the reaction vessel at the same time or separately one after the other. The amount of each anhydride to be introduced into the reaction vessel is determined depending on the desired degree of esterification to be obtained in the final product, usually being 1 to 10 times the stoichiometric amounts of the desired molar degree of substitution of the anhydroglucose units by esterification. The molar ratio between the anhydride of an aliphatic monocarboxylic acid and the anhydroglucose units of the cellulose ether generally is 0.1/1 or more, preferably 0.3/1 or more, more preferably 0.5/1 or more, most preferably 1/1 or more, and particularly 1.5/1 or more. The molar ratio between the anhydride of an aliphatic monocarboxylic acid and the anhydroglucose units of the cellulose ether preferably is 17/1 or less, more preferably 10/1 or less, and most preferably 6/1 or less.

The molar ratio between the anhydride of a dicarboxylic acid and the anhydroglucose units of cellulose ether preferably is 0.01/1 or more, more preferably 0.04/1 or more, and most preferably 0.2/1 or more. The molar ratio between the anhydride of a dicarboxylic acid and the anhydroglucose units of cellulose ether preferably is 2.5/1 or less, more preferably 1.5/1 or less, and most preferably 1/1 or less.

The molar number of anhydroglucose units of the cellulose ether utilized in the process of the present invention can be determined from the weight of the cellulose ether used as a starting material, by calculating the average molecular weight of the substituted anhydroglucose units from the DS(alkoxyl) and MS(hydroxyalkoxyl).

The esterification of the cellulose ether is conducted in an aliphatic carboxylic acid as a reaction diluent, such as acetic acid, propionic acid, or butyric acid. The reaction diluent can comprise minor amounts of other solvents or diluents which are liquid at room temperature and do not react with the cellulose ether, such as aromatic or aliphatic solvents like benzene, toluene, 1,4-dioxane, or tetrahydrofurane; or halogenated $C_1$-$C_3$ derivatives, like dichloro methane or dichloro methyl ether, but the amount of the aliphatic carboxylic acid should generally be more than 50 percent, preferably at least 75 percent, and more preferably at least 90 percent, based on the total weight of the reaction diluent. Most preferably the reaction diluent consists of an aliphatic carboxylic acid. Moreover, the esterification reaction is conducted in the presence of an alkali metal carboxylate, such as sodium acetate or potassium acetate, as the esterification catalyst.

The molar ratio [alkali metal carboxylate/anhydroglucose units of cellulose ether] is not more than [1.20/1] and the molar ratio [aliphatic carboxylic acid/anhydroglucose units of cellulose ether] is from [3.55/1] to [9.0/1]. Generally the molar ratio [alkali metal carboxylate/anhydroglucose units of cellulose ether] is from [0.20/1] to [1.20/1], preferably from [0.25/1] to [1.10/1], more preferably from [0.30/1] to [1.00/1], most preferably from [0.35/1] to [0.90/1], and in particular from [0.50/1] to [0.80/1]. Preferably the molar ratio [aliphatic carboxylic acid/anhydroglucose units of cellulose ether] is from [3.8/1] to [8.0/1], more preferably from [4.2/1] to [7.0/1], most preferably from [4.5/1] to [6.0/1], and particularly from [4.6/1] to [5.5/1]. Preferably the preferred, more preferred and most preferred ranges for the molar ratio [alkali metal carboxylate/anhydroglucose units of cellulose ether] are combined with the preferred, more preferred and most preferred ranges for the molar ratio [aliphatic carboxylic acid/anhydroglucose units of cellulose ether].

Applicants have surprisingly found that the weight average molecular weight $M_w$ of an esterified cellulose ether can be influenced by the chosen amounts of aliphatic carboxylic acid and/or alkali metal carboxylate that are present in the reaction mixture for esterification. This finding allows modification of the weight average molecular weight $M_w$ of an esterified cellulose ether in other ways than by increasing their degree of substitution of ester groups or by using a cellulose ether of a different molecular weight as a starting material. According to one embodiment of the invention the weight average molecular weight $M_w$ of the esterified cellulose ether is varied by varying the molar ratio [aliphatic carboxylic acid/anhydroglucose units of cellulose ether] and/or the molar ratio [alkali metal carboxylate/anhydroglucose units of cellulose ether]. Surprisingly, it has also been found that esterified cellulose ethers having substantially the same or even a higher weight average molecular weight than in prior art processes can be produced at considerably decreased costs if the molar ratio [alkali metal carboxylate/anhydroglucose units of cellulose ether] and the molar ratio [aliphatic carboxylic acid/anhydroglucose units of cellulose ether] are both reduced in the process for producing the esterified cellulose ether, as compared to the specific processes taught in the prior art. The process of the present invention provides a very economic way of producing esterified cellulose ethers. Not only considerably less raw materials are required, specifically less alkali metal carboxylate and less aliphatic carboxylic acid per mole of cellulose ether, which results in savings of raw material costs, but also the costs for separating excess raw materials from the esterified cellulose ether are significantly reduced. The reaction mixture is generally heated at 60° C. to 110° C., preferably at 70 to 100° C., for a period of time sufficient to complete the reaction, that is, typically from 2 to 25 hours, more typically from 2 to 8 hours. The cellulose ether as the starting material is not always soluble in the aliphatic carboxylic acid, but can only be dispersed in or swollen by the aliphatic carboxylic acid, especially when the degree of substitution in the cellulose ether is relatively small. The esterification reaction can take place even with such a dispersed or swollen cellulose ether and, as the esterification reaction proceeds, the cellulose ether under reaction generally dissolves in the reaction diluent, to finally give a homogeneous reaction mixture.

After completion of the esterification reaction, the reaction product can be precipitated from the reaction mixture in a known manner, for example by contacting with a large volume of water, such as described in U.S. Pat. No. 4,226,981, International Patent Application WO 2005/115330 or European Patent Application EP 0 219 426. However, in a preferred embodiment of the invention the reaction product mixture is preferably contacted with an amount of from 5 to 400, more preferably from 8 to 300, most preferably from 10 to 100, and particularly from 12 to 50 weight parts of water per weight part of cellulose ether used for esterification. The weight ratio [water/reaction product mixture excluding water] is generally from 1/1 to 10/1, preferably from 1.4/ to 5/1, more preferably from 2/1 to 3/1. In a preferred embodiment of the invention the combination of water and the reaction product mixture is subjected to a shear rate of at least 800 $s^{-1}$, preferably at least 1500 $s^{-1}$, more preferably at least 3000 $s^{-1}$, and most preferably at least 8000 $s^{-1}$. The shear rate is generally up to 600,000 $s^{-1}$, and typically up to 500,000 $s^{-1}$. Applying such shear rates in the process of the present invention is useful for providing esters of cellulose ethers which are non-tacky and of fine particle size upon precipitation and separation from the reaction product mixture. According to known precipitation processes such non-tacky and fine particles are not achieved. This shear rate can be obtained in a high shear device, such as a high shear mixer, also known as rotor-stator mixer or homogenizer, high shear mill or high shear pump. A high shear device commonly comprises a rotor in combination with a stationary part of the shear device, also referred to as "stationary", such as a stator or housing. The stationary creates a close-clearance gap between the rotor and itself and forms a high-shear zone for materials in this gap. The stationary can include single or multiple rows of openings, gaps or teeth to induce a kind of shear frequency and increased turbulent energy. One metric for the degree or thoroughness of mixing is the shearing force generated by a mixing device with a high tip speed. Fluid undergoes shear when one area of fluid travels with a different velocity relative to an adjacent area. The tip speed of the rotor is a measure of the kinetic energy generated by the rotation according to the formula: Tip speed=rotation rate of rotor×rotor circumference. The shear rate is based on the inverse relationship between the gap distance between the rotor and the stationary part of the shear device which is commonly referred to as the stator or housing. In the case the high shear device is not equipped with a stator, the inner wall of a precipitation vessel serves as a stator. The formula applies: Shear rate=Tip speed/gap distance between outer diameter of rotor and stationary. The high shear device generally runs at a tip speed of at least 4 m/s, preferably at least 8 m/s, more preferably at least 15 m/s, and most preferably at least 30 m/s. The tip speed is generally up to 320 m/s, typically up to 280 m/s.

The dispersed ester of the cellulose ether can subsequently be separated from the remainder of the mixture in a known manner, such as by centrifugation or filtration or upon settling by decantation. The recovered ester of the cellulose ether can be washed with water to remove impurities and dried to produce a esterified cellulose ether in the form of a powder.

According to the process of the present invention an esterified cellulose ether is produced that has (i) aliphatic monovalent acyl groups or (ii) groups of the formula —C(O)—R—COOA wherein R is a divalent aliphatic or aromatic hydrocarbon group or (iii) a combination of aliphatic monovalent acyl groups and groups of the formula —C(O)—R—COOA wherein R is a divalent aliphatic or aromatic hydrocarbon group and A is hydrogen or a cation. The cation preferably is an ammonium cation, such as $NH_4^+$ or an alkali metal ion, such as the sodium or potassium ion, more preferably the sodium ion. Most preferably, A is hydrogen.

The aliphatic monovalent acyl groups are preferably selected from the group consisting of acetyl, propionyl, and butyryl, such as n-butyryl or i-butyryl.

Preferred groups of the formula —C(O)—R—COOA are —C(O)—CH$_2$—CH$_2$—COOA, such as —C(O)—CH$_2$—CH$_2$—COOH or —C(O)—CH$_2$—CH$_2$—COO$^-$Na$^+$, —C(O)—CH=CH—COOA, such as —C(O)—CH=CH—COOH or —C(O)—CH=CH—COO$^-$Na$^+$, or —C(O)—C$_6$H$_4$—COOA, such as —C(O)—C$_6$H$_4$—COOH or —C(O)—C$_6$H$_4$—COO$^-$Na$^+$.

In the groups of formula —C(O)—C$_6$H$_4$—COOA the carbonyl group and the carboxylic group are preferably arranged in ortho-positions.

Preferred esterified cellulose ethers are i) HPMCXY and HPMCX, wherein HPMC is hydroxypropyl methyl cellulose, X is A (acetate), or X is B (butyrate) or X is Pr (propionate) and Y is S (succinate), or Y is P (phthalate) or Y is M (maleate), such as hydroxypropyl methyl cellulose acetate phthalate (HPMCAP), hydroxypropyl methyl cellulose acetate maleate (HPMCAM), hydroxypropyl methylcellulose acetate succinate (HPMCAS) or hydroxypropyl methyl cellulose acetate (HPMCA); or ii) hydroxypropyl methyl cellulose phthalate (HPMCP); hydroxypropyl cellulose acetate succinate (HPCAS), hydroxybutyl methyl cellulose propionate succinate (HBMCPrS), hydroxyethyl hydroxypropyl cellulose propionate succinate (HEHPCPrS); and methyl cellulose acetate succinate (MCAS).

Hydroxypropyl methylcellulose acetate succinate (HPMCAS) is the most preferred esterified cellulose ether.

The esterified cellulose ethers have a DS(methoxyl) and an MS(hydroxyalkoxyl) as indicated further above.

The esterified cellulose ethers generally have a degree of substitution of aliphatic monovalent acyl groups, such as acetyl, propionyl, or butyryl groups, of 0 to 1.75, preferably of 0.05 to 1.50, more preferably of 0.10 to 1.25, and most preferably of 0.20 to 1.00.

The esterified cellulose ethers generally have a degree of substitution of groups of formula —C(O)—R—COOA, such as succinoyl, of 0 to 1.6, preferably of 0.05 to 1.30, more preferably of 0.05 to 1.00, and most preferably of 0.10 to 0.70 or even 0.10 to 0.60.

The sum of i) the degree of substitution of aliphatic monovalent acyl groups and ii) the degree of substitution of groups of formula —C(O)—R—COOA is greater than 0. It is generally from 0.05 to 2.0, preferably from 0.10 to 1.4, more preferably from 0.20 to 1.15, most preferably from 0.30 to 1.10 and particularly from 0.40 to 1.00.

The content of the acetate and succinate ester groups is determined according to "Hypromellose Acetate Succinate, United States Pharmacopia and National Formulary, NF 29, pp. 1548-1550". Reported values are corrected for volatiles (determined as described in section "loss on drying" in the above HPMCAS monograph). The method may be used in analogue manner to determine the content of propionyl, butyryl, phthalyl and other ester groups.

The content of ether groups in the esterified cellulose ether is determined in the same manner as described for "Hypromellose", United States Pharmacopeia and National Formulary, USP 35, pp 3467-3469.

The contents of ether and ester groups obtained by the above analyses are converted to DS and MS values of individual substituents according to the formulas below. The formulas may be used in analogue manner to determine the DS and MS of substituents of other cellulose ether esters.

$$\% \text{ cellulose backbone} = 100 - \left(\% \text{ MeO} * \frac{M(OCH_3) - M(OH)}{M(OCH_3)}\right) - \left(\% \text{ HPO} * \frac{M(OCH_2CH(OH)CH_3) - M(OH)}{M(OCH_2CH(OH)CH_3)}\right) - \left(\% \text{ Acetyl} * \frac{M(COCH_3) - M(H)}{M(COCH_3)}\right) - \left(\% \text{ Succinoyl} * \frac{M(COC_2H_4COOH) - M(H)}{M(COC_2H_4COOH)}\right)$$

$$DS(\text{Me}) = \frac{\frac{\% \text{ MeO}}{M(OCH_3)}}{\frac{\% \text{ cellulose backbone}}{M(AGU)}}$$

$$MS(\text{HP}) = \frac{\frac{\% \text{ HPO}}{M(HPO)}}{\frac{\% \text{ cellulose backbone}}{M(AGU)}}$$

$$DS(\text{Acetyl}) = \frac{\frac{\% \text{ Acetyl}}{M(\text{Acetyl})}}{\frac{\% \text{ cellulose backbone}}{M(AGU)}}$$

$$DS(\text{Succinoyl}) = \frac{\frac{\% \text{ Succinoyl}}{M(\text{Succinoyl})}}{\frac{\% \text{ cellulose backbone}}{M(AGU)}}$$

$M(MeO) = M(OCH_3) = 31.03$ Da $M(HPO) = M(OCH_2CH(OH)CH_3) = 75.09$ Da $M(\text{Acetyl}) = M(COCH_3) = 43.04$ Da $M(\text{Succcinoyl}) = M(COC_2H_4COOH) = 101.08$ Da $M(AGU) = 162.14$ Da $M(OH) = 17.008$ Da $M(H) = 1.008$ Da By convention, the weight percent is an average weight percentage based on the total weight of the cellulose repeat unit, including all substituents. The content of the methoxyl group is reported based on the mass of the methoxyl group (i.e., —OCH$_3$). The content of the hydroxyalkoxyl group is reported based on the mass of the hydroxyalkoxyl group (i.e., O-alkylene-OH); such as hydroxypropoxyl (i.e., —O—CH$_2$CH(CH$_3$)—OH). The content of the aliphatic monovalent acyl groups is reported based on the mass of —C(O)—R$_1$ wherein R$_1$ is a monovalent aliphatic group, such as acetyl (—C(O)—CH$_3$). The content of the group of formula —C(O)—R—COOH is based on the mass of this group, such as the mass of succinoyl groups (i.e., —C(O)—CH$_2$—CH$_2$—COOH).

It has been found that the esterified cellulose ether(s) produced according to the process of the present invention has/have a higher weight average molecular weight than expected based on the weight average molecular weight of the cellulose ether used as a starting material. Without wanting to be bound by the theory, it is believed that this higher molecular weight is created by hydrophobic/hydrophilic chain association and/or crosslinking reactions.

According to the above described process esterified cellulose ethers are produced which generally have a weight average molecular weight $M_w$ of from 40,000 to 700,000 Dalton, preferably from 70,000 to 400,000 Dalton, more preferably from 100,000 to 250,000 Dalton. The produced esterified cellulose ethers generally have a number average molecular weight $M_n$, of from 10,000 to 250,000 Dalton, preferably from 15,000 to 150,000 Dalton, more preferably from 20,000 to 50,000 Dalton. The produced esterified cellulose ethers generally have a z-average molecular weight, $M_z$, of from 150,000 to 2,500,000 Dalton, preferably from 300,000 to 2,000,000 Dalton, more preferably from 500,000 to 1,800,000 Dalton.

$M_w$, $M_n$, and $M_z$ are measured according to Journal of Pharmaceutical and Biomedical Analysis 56 (2011) 743 using a mixture of 40 parts by volume of acetonitrile and 60 parts by volume of aqueous buffer containing 50 mM NaH$_2$PO$_4$ and 0.1 M NaNO$_3$ as mobile phase. The mobile phase is adjusted to a pH of 8.0. The measurement of $M_w$, $M_n$, and $M_z$ is described in more details in the Examples.

Some embodiments of the invention will now be described in detail in the following Examples.

EXAMPLES

Unless otherwise mentioned, all parts and percentages are by weight. In the Examples the following test procedures are used.
Content of Ether and Ester Groups:

The content of ether groups in the esterified cellulose ether is determined in the same manner as described for "Hypromellose", United States Pharmacopeia and National Formulary, USP 35, pp 3467-3469.

The ester substitution with acetyl groups (—CO—CH$_3$) and the ester substitution with succinyl groups (—CO—CH$_2$—CH$_2$—COOH) are determined according to Hypromellose Acetate Succinate, United States Pharmacopia and National Formulary, NF 29, pp. 1548-1550". Reported values for ester substitution are corrected for volatiles (determined as described in section "loss on drying" in the above HPMCAS monograph).
Determination of $M_w$, $M_n$ and $M_z$ Mw, Mn and Mz are measured according to Journal of Pharmaceutical and Biomedical Analysis 56 (2011) 743 unless stated otherwise. The mobile phase was a mixture of 40 parts by volume of acetonitrile and 60 parts by volume of aqueous buffer containing 50 mM NaH2PO4 and 0.1 M NaNO3. The mobile phase was adjusted to a pH of 8.0. Solutions of the cellulose ether esters were filtered into a HPLC vial through a syringe filter of 0.45 µm pore size.

More specifically, the utilized Chemicals and solvents were:
Polyethylene oxide standard materials (abbreviated as PEOX 20 K and PEOX 30 K) were purchased from Agilent Technologies, Inc. Palo Alto, Calif., catalog number PL2083-1005 and PL2083-2005.

Acetonitrile (HPLC grade ≥99.9%, CHROMASOL plus), catalog number 34998, sodium hydroxide (semiconductor grade, 99.99%, trace metal base), catalog number 306576, water (HPLC grade, CHROMASOLV Plus) catalog number 34877 and sodium nitrate (99,995%, trace metal base) catalog number 229938 were purchased from Sigma-Aldrich, Switzerland.

Sodium dihydrogen phosphate (≥99.999% TraceSelect) catalog number 71492. was purchased from FLUKA, Switzerland.

The normalization solution of PEOX20 K at 5 mg/mL, the standard solution of PEOX30 K at 2 mg/mL, and the sample solution of HPMCAS at 2 mg/mL were prepared by adding a weighed amount of polymer into a vial and dissolving it with a measured volume of mobile phase. All solutions were allowed to dissolve at room temperature in the capped vial for 24 h with stirring using a PTFE-coated magnetic stirring bar.

The normalization solution (PEOX 20k, single preparation, N) and the standard solution (PEOX30 K, double preparation, S1 and S2) were filtered into a HPLC vial through a syringe filter of 0.02 µm pore size and 25 mm diameter (Whatman Anatop 25, catalog number 6809-2002), Whatman.

The test sample solution (HPMCAS, prepared in duplicate, T1, T2) and a laboratory standard (HPMCAS, single preparation, LS) were filtered into a HPLC vial through a syringe filter of 0.45 µm pore size (Nylon, e.g. Acrodisc 13 mm VWR catalog number 514-4010).

Chromatographic condition and run sequence were conducted as described by Chen, R. et al.; Journal of Pharmaceutical and Biomedical Analysis 56 (2011) 743-748). The SEC-MALLS instrument set-up included a HP1100 HPLC system from Agilent Technologies, Inc. Palo Alto, Calif.; a DAWN Heleos II 18 angle laser light scattering detector and a OPTILAB rex refractive index detector, both from Wyatt Technologies, Inc. Santa Barbara, Calif. The analytical size exclusion column (TSK-GEL® GMPWXL, 300×7 8 mm) was purchased from Tosoh Bioscience. Both the OPTILAB and the DAWN were operated at 35° C. The analytical SEC column was operated at room temperature (24±5° C.). The mobile phase was a mixture of 40 volume parts of acetonitrile and 60 volume parts of aqueous buffer containing 50 mM NaH2PO4 and 0.1 M NaNO3 prepared as follows:

Aqueous buffer: 7.20 g of sodium dihydrogen phosphate and 10.2 g of sodium nitrate were added to 1.2 L purified water in a clean 2 L glass bottle under stirring until dissolution.

Mobile phase: 800 mL of acetonitrile were added to 1.2 L of the aqueous buffer prepared above, and stirred until a good mixture was achieved and the temperature equilibrated to ambient temperature.
The mobile phase was pH adjusted to 8.0 with 10M NaOH and filtered through a 0.2 m nylon membrane filter. The flow rate was 0.5 mL/min with in-line degassing. The injection volume was 100 µL and the analysis time was 35 min.

The MALLS data were collected and processed by Wyatt ASTRA software (version 5.3.4.20) using dn/dc value (refractive index increment) of 0.120 mL/g for HPMCAS. The light scattering signals of detector Nos. 1-4, 17, and 18) were not used in the molecular weight calculation. A representative chromatographic run sequence is given below: B, N, LS, S1 (5×), S2, T1 (2×), T2 (2×), T3 (2×), T4 (2×), S2, T5(2×), etc., S2, LS, W, where, B represents blank injection of mobile phase, N1 represents normalization solution; LS represents a laboratory standard HPMCAS; S1 and S2 represent standard solutions one and two, respectively; T1, T2, T3, T4, and T5 represent test sample solutions and W represents water injection. (2×) and (5×) denote the number of injections of the same solution.

Both the OPTILAB and the DAWN were calibrated periodically according to the manufacturer's recommended procedures and frequency. A 100 μL injection of a 5 mg/mL polyethylene oxide standard (PEOX20 K) was employed for normalizing all angle light scattering detectors relative to 90° detector for each run sequence.

Use of this mono-dispersed polymer standard also enabled the volume delay between the OPTILAB and the DAWN to be determined, permitting proper alignment of the light scattering signals to the refractive index signal. This is necessary for the calculation of the weight-averaged molecular weight (Mw) for each data slice.

Production of Hydroxypropyl Methyl Cellulose Acetate Succinate (HPMCAS) of Examples 1-5

Glacial acetic acid, acetic anhydride, a hydroxypropyl methylcellulose (HPMC), succinic anhydride and sodium acetate (water free) were introduced in the amounts listed in Table 1 below into a reaction vessel of 3 L volume under thorough stirring.

The HPMC had a methoxyl substitution ($DS_M$) and hydroxypropoxyl substitution ($MS_{HP}$) as listed in Table 2 below and a viscosity of about 3 mPa·s, measured as a 2% solution in water at 20° C. according to ASTM D2363-79 (Reapproved 2006). The weight average molecular weight of the HPMC was about 20,000 Dalton. The HPMC is commercially available from The Dow Chemical Company as Methocel E3 LV Premium cellulose ether.

The mixture was heated at 85° C. with agitation for 3.5 hours to effect esterification. In Examples 1-4 2.3 L of water was added to the reactor under stirring to precipitate the HPMCAS. The precipitated product was removed from the reactor and washed with 16 L of water by applying high shear mixing using an Ultra-Turrax stirrer S50-G45 running at 5200 rpm. The product was isolated by filtration and dried at 50° C. overnight.

Example 5 was carried out as Examples 1-4, except that 2 L of water was added to the reactor to precipitate the HPMCAS and the precipitated product was washed once with 3 L of water and four times with 3.5 L of water.

Production of HPMCAS of Comparative Examples A and B

The production of HPMCAS according to Comparative Examples A and B was carried out as in Examples 1 to 4, except that the weight ratios of glacial acetic acid, acetic anhydride, a hydroxypropyl methylcellulose (HPMC), succinic anhydride and sodium acetate (water free) were used as disclosed in Example 2 of European Patent Application EP 0219 426 A2. The used amounts are listed in Table 1 below.

The HPMC used in Comparative Examples A and B respectively had a viscosity of about 6 mPa·s and about 3 mPa·s respectively, measured as a 2% solution in water at 20° C. according to ASTM D2363-79 (Reapproved 2006). Each HPMC contained about 10% by weight of hydroxypropoxyl groups and about 29% by weight of methoxyl groups. These HPMC's are commercially available from The Dow Chemical Company as Methocel E6 LV Premium cellulose ether and Methocel E3 LV Premium cellulose ether respectively.

The mixture was heated at 85° C. with agitation for 3.5 hours to effect esterification. 1.2 L of water was added to the reactor under stirring to precipitate the HPMCAS. The precipitated product was removed from the reactor and washed with 8 L of water by applying high shear mixing using an Ultra-Turrax stirrer S50-G45 running at 5200 rpm. The product was isolated by filtration and dried at 55° C. for 12 h.

Production of Comparative Example C

The production of HPMCAS according to Comparative Example C was carried out as in Examples 1 to 4, except that the weight ratios of glacial acetic acid, acetic anhydride, HPMC, succinic anhydride and sodium acetate (water free) were used as disclosed in Comparative Example 3 of U.S. Pat. No. 5,776,501. The HPMC used in Comparative Example 3 of U.S. Pat. No. 5,776,501 had a viscosity of 8.9 mPa·s, measured as a 2% solution in water. However, to avoid that differences in HPMC viscosity have an impact on the molecular weight of the HPMCAS, the same HPMC was used in Comparative Example B as in Examples 1-4.

The used amounts are listed in Table 1 below. The mixture was heated at 85° C. with agitation for 5 hours to effect esterification. 252.86 g of water was added to the reactor under stirring, followed by addition of 70.71 g concentrated hydrochloric acid (concentration of 37 wt-%). The precipitated product was obtained by adding the reaction mixture to 3.1 L of water under stirring (200 rpm). The crude product was washed with 11 L of water by applying high shear mixing using an Ultra-Turrax stirrer S50-G45 running at 5200 rpm. The product was isolated by filtration and dried at 55° C. for 12 h.

Repetition of Comparative Examples A-C

The obtained ester substitutions % acetyl and % succinoyl in Comparative Examples A and B were significantly different from those disclosed in Example 2 of European Patent Application EP 0219 426 A2. In Comparative Example C the obtained ester substitutions % acetyl and % succinoyl matched reasonably well with the ester substitutions reported in Comparative Example 3 of U.S. Pat. No. 5,776,501.

Therefore, Comparative Examples A-C were repeated. The obtained ester substitutions % acetyl and % succinoyl in the repeated set of Comparative Examples A-C were substantially the same as in the first set of Comparative Examples A-C. The results in Tables 1 and 2 show the average of the two sets of Comparative Examples A, B, and C.

The results of Examples 1-4 and of Comparative Examples A-C are listed in Table 2 below. In Table 2 the abbreviations have the following meanings:

$DS_M$=DS(methoxyl): degree of substitution with methoxyl groups;

$MS_{HP}$=MS(hydroxypropoxyl): molar subst. with hydroxypropoxyl groups;

$DOS_{Ac}$: degree of substitution of acetyl groups;

$DOS_s$: degree of substitution of succinoyl groups.

TABLE 1

| (Comp.) Example | HPMC* G | HPMC* mol | acetic acid G | acetic acid HPMC | Succinic anhydride mol/mol G | Succinic anhydride mol/mol HPMC | Acetic anhydride mol/mol g | Acetic anhydride mol/mol HPMC | Sodium acetate mol/mol g | Sodium acetate mol/mol HPMC | Molecular weight (kDA) Mn | Molecular weight (kDA) Mw | Molecular weight (kDA) Mz |
|---|---|---|---|---|---|---|---|---|---|---|---|---|---|
| 1 | 230 | 1.14 | 380 | 5.6 | 38.8 | 0.34 | 142.6 | 1.28 | 50.0 | 0.54 | 52 | 166 | 1084 |
| 2 | 230 | 1.14 | 350 | 5.1 | 38.8 | 0.34 | 142.6 | 1.28 | 50.0 | 0.54 | 77 | 230 | 1048 |
| 3 | 230 | 1.14 | 330 | 4.8 | 38.8 | 0.34 | 142.6 | 1.28 | 50.0 | 0.54 | 96 | 285 | 1185 |
| 4 | 230 | 1.14 | 330 | 4.8 | 38.8 | 0.34 | 142.6 | 1.28 | 50.0 | 0.54 | 103 | 299 | 1212 |
| 5 | 230 | 1.14 | 415 | 6.0 | 40 | 0.35 | 90 | 0.81 | 95.15 | 1.03 | 52 | 165 | 1020 |
| A[1] | 100 | 0.49 | 300 | 10.1 | 25 | 0.51 | 38 | 0.78 | 80 | 1.97 | 87 | 270 | 1060 |
| B[2] | 100 | 0.49 | 300 | 10.1 | 25 | 0.51 | 38 | 0.78 | 80 | 1.97 | 26 | 65 | 329 |
| C | 150 | 0.74 | 450 | 10.1 | 37.79 | 0.51 | 57.43 | 0.79 | 59.57 | 0.98 | 23 | 53 | 342 |

*calculated on the dried basis
[1] Comparative Example A: HPMC of 6 mPa · s
[2] Comparative Example B: HPMC of 3 mPa · s

TABLE 2

| Example | Molecular weight (kDA) Mn | Molecular weight (kDA) Mw | Molecular weight (kDA) Mz | Ether Substitution Methoxyl (%) | Ether Substitution Hydroxy-propoxyl (%) | Ester substitution Acetyl (%) | Ester substitution Succinoyl (%) | Ether Substitution $DS_M$ | Ether Substitution $MS_{HP}$ | Ester substitution $DOS_{Ac}$ | Ester substitution $DOS_s$ |
|---|---|---|---|---|---|---|---|---|---|---|---|
| 1 | 52 | 166 | 1084 | 23.5 | 7.7 | 8.5 | 10.7 | 1.90 | 0.26 | 0.50 | 0.27 |
| 2 | 77 | 230 | 1048 | 23.3 | 7.5 | 8.9 | 10.58 | 1.89 | 0.25 | 0.52 | 0.26 |
| 3 | 96 | 285 | 1185 | 23.3 | 7.5 | 8.8 | 11 | 1.90 | 0.25 | 0.52 | 0.27 |
| 4 | 103 | 299 | 1212 | 22.9 | 7.4 | 8.5 | 10.2 | 1.83 | 0.24 | 0.49 | 0.25 |
| 5 | 52 | 165 | 1020 | 23.6 | 7.7 | 6.2 | 13.5 | 1.93 | 0.26 | 0.37 | 0.34 |
| A[1] | 87 | 270 | 1060 | 21.9 | 7.2 | 5.6 | 16.8 | 1.83 | 0.25 | 0.34 | 0.43 |
| B[2] | 26 | 65 | 329 | 22.9 | 7.3 | 5.7 | 16.0 | 1.97 | 0.25 | 0.34 | 0.41 |
| C | 23 | 53 | 342 | 23.7 | 7.6 | 5.8 | 14.7 | 1.96 | 0.26 | 0.35 | 0.37 |

[1] Comparative Example A: HPMC of 6 mPa · s
[2] Comparative Example B: HPMC of 3 mPa · s Examples 3 and 4 represent the independent repetition of the same reaction. The measured molecular weights Mn, Mw and Mz are within the normal variations of the two independent reactions.

The comparison of Examples 3/4 with Examples 1 and 2 illustrates that the weight average molecular weight of an esterified cellulose ether can be varied by varying the molar ratio [aliphatic carboxylic acid/anhydroglucose units of cellulose ether] in the process for producing the esterified cellulose ether, even when the cellulose ether used as a starting material and the amounts of esterifying agents are kept the same. When decreasing the molar ratio [aliphatic carboxylic acid/anhydroglucose units of cellulose ether], the weight average molecular weight of the produced esterified cellulose ether, such as HPMCAS, increases.

It is highly surprising that the HPMCAS of Examples 1-4 have a much higher weight average molecular weight Mw than the HPMCAS produced according to Comparative Examples B and C although much smaller molar ratios [sodium acetate/anhydroglucose units of cellulose ether] and [acetic acid/anhydroglucose units of cellulose ether] are used in Examples 1-4 than in Comparative Example B and C.

This does not only result in savings of raw material costs, but also reduces the costs for separating excess raw materials from the esterified cellulose ether. By the process of the present invention considerably fewer raw materials are required.

The finding discussed above is highly surprising in view of the results obtained in Comparative Examples B and C.

The molar ratio [sodium acetate/anhydroglucose units of cellulose ether] in Comparative Example C was smaller than in Comparative Example B, and the Mw in Comparative Example C was also smaller than in Comparative Example B.

It is also surprising that a similar Mw is achieved in Examples 3 and 4 as in Comparative Example A, although the HPMC used as starting material in Examples 3 and 4 has a lower viscosity than the HPMC used in Comparative Example A and although the molar ratios [succinic anhydride/anhydroglucose units of cellulose ether] and [acetic anhydride/anhydroglucose units of cellulose ether] in Examples 3 and 4 are much smaller than in Comparative Example A.

In Example 5 the molar ratio [sodium acetate/anhydroglucose units of cellulose ether] was chosen to be comparable to that used in Comparative Example C (and accordingly lower than that used in Comparative Example B). In Example 5 the molar ratio [acetic acid/anhydroglucose units of cellulose ether] was considerably smaller than in Comparative Examples B and C. It is highly surprising that in Example 5 HPMCAS of a much higher weight average molecular weight Mw is achieved than in Comparative Examples B and C.

The molar ratios [succinic anhydride/anhydroglucose units of cellulose ether] and [acetic anhydride/anhydroglucose units of cellulose ether] in Example 5 were chosen with the aim to achieve a similar ester substitution in Example 5 as in Comparative Example C. It is highly surprising that in the process of the present invention a considerably lower molar ratio [succinic anhydride/anhydroglucose units of cellulose ether] is needed to achieve a similar ester substitution as in the process of Comparative Example C.

The invention claimed is:

1. A process for preparing an esterified cellulose ether wherein a cellulose ether is esterified with (i) succinic anhydride or phthalic anhydride or with (ii) succinic anhydride or phthalic anhydride in combination with an aliphatic monocarboxylic acid anhydride selected from the group consisting of acetic anhydride, butyric anhydride and propionic anhydride
in the presence of an alkali metal carboxylate and an aliphatic carboxylic acid, wherein the molar ratio [alkali metal carboxylate/anhydroglucose units of cellulose ether] is from [0.30/1] to [1.00/1], the molar ratio [aliphatic carboxylic acid/anhydroglucose units of cellulose ether] is from [3.55/1] to [9.0/1] and the cellulose ether is a hydroxypropyl methylcellulose having a viscosity of from 2.4 to 200 mPa·s, measured as a 2 weight-% solution in water at 20° C. according to ASTM D2363-79 (Reapproved 2006), and the prepared esterified cellulose ether has a weight average molecular weight $M_w$ of from 70,000 to 700,000 Dalton.

2. The process of claim 1 wherein the molar ratio [aliphatic carboxylic acid/anhydroglucose units of cellulose ether] is from [3.8/1] to [8.0/1].

3. The process of claim 2 wherein the molar ratio [aliphatic carboxylic acid / anhydroglucose units of cellulose ether] is from [4.5/1] to [6.0/1].

4. The process of claim 1 wherein the molar ratio [alkali metal carboxylate / anhydroglucose units of cellulose ether] is from [0.35/1] to [0.90/1].

5. The process of claim 4 wherein the molar ratio [alkali metal carboxylate / anhydroglucose units of cellulose ether] is from [0.50/1] to [0.80/1].

6. The process of claim 1 wherein the cellulose ether has a viscosity of from 2.5 to 50 mPa·s, measured as a 2 weight-% solution in water at 20° C. according to ASTM D2363-79 (Reapproved 2006).

7. The process of claim 1 wherein the cellulose ether is esterified with succinic anhydride or phthalic anhydride in combination with an aliphatic monocarboxylic acid anhydride selected from the group consisting of acetic anhydride, butyric anhydride and propionic anhydride.

8. The process of claim 7 wherein hydroxypropyl methylcellulose is esterified with succinic anhydride and acetic anhydride to produce hydroxypropyl methyl cellulose acetate succinate.

9. The process of claim 1 wherein the produced esterified cellulose ether has a weight average molecular weight $M_w$ of from 100,000 to 700,000 Dalton.

10. A process for preparing an esterified cellulose ether wherein a cellulose ether is esterified with (i) succinic anhydride or phthalic anhydride or with (ii) succinic anhydride or phthalic anhydride in combination with an aliphatic monocarboxylic acid anhydride selected from the group consisting of acetic anhydride, butyric anhydride and propionic anhydride in the presence of an alkali metal carboxylate and an aliphatic carboxylic acid, wherein the molar ratio [alkali metal carboxylate/anhydroglucose units of cellulose ether] is from [0.30/1] to [1.00/1], the molar ratio [aliphatic carboxylic acid/anhydroglucose units of cellulose ether] is from [3.55/1] to [9.0/1], the cellulose ether is a hydroxyalkyl alkylcellulose, the weight average molecular weight $M_w$ of the esterified cellulose ether is varied by varying the molar ratio [aliphatic carboxylic acid/anhydroglucose units of cellulose ether] and the prepared esterified cellulose ether has a weight average molecular weight $M_w$ of from 70,000 to 700,000 Dalton.

11. A process for preparing an esterified cellulose ether wherein a cellulose ether is esterified with (i) succinic anhydride or phthalic anhydride or with (ii) succinic anhydride or phthalic anhydride in combination with an aliphatic monocarboxylic acid anhydride selected from the group consisting of acetic anhydride, butyric anhydride and propionic anhydride in the presence of an alkali metal carboxylate and an aliphatic carboxylic acid, wherein the molar ratio [alkali metal carboxylate/anhydroglucose units of cellulose ether] is from [0.30/1] to [1.00/1], the molar ratio [aliphatic carboxylic acid/anhydroglucose units of cellulose ether] is from [3.55/1] to [9.0/1], the cellulose ether is a hydroxyalkyl alkylcellulose, the weight average molecular weight $M_w$ of the esterified cellulose ether is varied by varying the molar ratio [alkali metal carboxylate/anhydroglucose units of cellulose ether] and the prepared esterified cellulose ether has a weight average molecular weight $M_w$ of from 70,000 to 700,000 Dalton.

12. The process of claim 2 wherein the molar ratio [alkali metal carboxylate/anhydroglucose units of cellulose ether] is from [0.50/1] to [0.80/1].

13. The process of claim 12 wherein hydroxypropyl methylcellulose is esterified with succinic anhydride and acetic anhydride to produce hydroxypropyl methyl cellulose acetate succinate.

14. The process of claim 13 wherein the produced hydroxypropyl methyl cellulose acetate succinate has a weight average molecular weight $M_w$ of from 100,000 to 700,000 Dalton.

* * * * *